(12) United States Patent
Tanaka et al.

(10) Patent No.: US 7,199,182 B2
(45) Date of Patent: Apr. 3, 2007

(54) AQUEOUS RESIN COMPOSITION, INK JET RECORDING MATERIAL AND INK JET RECORDING METHOD

(75) Inventors: Yoshimasa Tanaka, Osaka (JP); Masato Inoue, Osaka (JP); Masatoshi Matsuo, Osaka (JP); Yutaka Hashimoto, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/311,304

(22) PCT Filed: Jun. 28, 2001

(86) PCT No.: PCT/JP01/05552

§ 371 (c)(1),
(2), (4) Date: Dec. 27, 2002

(87) PCT Pub. No.: WO02/02695

PCT Pub. Date: Jan. 10, 2002

(65) Prior Publication Data

US 2003/0103129 A1 Jun. 5, 2003

(30) Foreign Application Priority Data

Jun. 30, 2000 (JP) .............................. 2000-198514
Feb. 16, 2001 (JP) .............................. 2001-040027

(51) Int. Cl.
*C08L 75/04* (2006.01)
*C08K 3/10* (2006.01)
*B41M 5/40* (2006.01)
*B41J 2/01* (2006.01)

(52) U.S. Cl. .................... 524/591; 524/436; 428/32.34; 428/32.37; 347/105

(58) Field of Classification Search .............. 524/400, 524/425, 430, 436, 447, 451, 557, 591; 428/32.34, 428/32.37, 32.38
See application file for complete search history.

(56) References Cited

U.S. PATENT DOCUMENTS

| 4,293,474 A * | 10/1981 | Dieterich et al. ............ 524/591 |
| 5,102,731 A * | 4/1992 | Takimoto et al. ......... 428/32.18 |
| 5,589,259 A * | 12/1996 | Hosoi et al. .............. 428/32.18 |
| 5,741,849 A * | 4/1998 | Blum et al. .................. 524/591 |
| 5,912,085 A * | 6/1999 | Ito et al. ...................... 428/500 |
| 6,057,026 A * | 5/2000 | Tsuchiya et al. .......... 428/32.29 |
| 6,225,381 B1 * | 5/2001 | Sharma et al. ................. 524/35 |
| 6,245,695 B1 * | 6/2001 | Maruo et al. ................ 442/136 |
| 6,350,507 B1 * | 2/2002 | Iwamoto et al. .......... 428/32.33 |
| 6,641,875 B2 * | 11/2003 | Sadasivan et al. ........ 428/32.35 |
| 2003/0072935 A1* | 4/2003 | Iwasa et al. .............. 428/317.9 |
| 2004/0058202 A1* | 3/2004 | Payne et al. ................. 428/704 |

FOREIGN PATENT DOCUMENTS

| EP | 0 943 450 A2 | 9/1999 |
| JP | 63273673 A * | 11/1988 |
| JP | 10-181189 | 7/1998 |
| JP | 10181189 A * | 7/1998 |
| JP | 11-321090 | 11/1999 |
| JP | 2000-109532 | 4/2000 |
| JP | 2001-71632 | 3/2001 |
| KR | 1999-0077984 | 10/1999 |
| WO | WO 00/61375 | 10/2000 |

OTHER PUBLICATIONS

Machine Translation JP 2000-109532 A (2000).*
Machine Translation JP 2001-071632 A (2001).*
Machine Translation of JP 10-181189 (1998).*
European Search Report dated Sep. 4, 2004.

* cited by examiner

*Primary Examiner*—Callie Shosho
(74) *Attorney, Agent, or Firm*—Armstrong, Kratz, Quintos, Hanson, & Brooks, LLP.

(57) ABSTRACT

An aqueous resin composition is provided which does not use a high boiling point solvent, and yet displays favorable long term stability and excellent film formation, and does not suffer from problems such as skin generation. The aqueous resin composition comprises a water soluble magnesium salt (A) and an aqueous polyurethane (B).

6 Claims, No Drawings

AQUEOUS RESIN COMPOSITION, INK JET RECORDING MATERIAL AND INK JET RECORDING METHOD

BACKGROUND OF THE INVENTION

1. Field of the Invention

The present invention relates to a highly stable aqueous resin composition comprising a water soluble magnesium salt and an aqueous polyurethane, as well as a recording material, an ink jet recording material, and an ink jet recording method using the same. Specifically, the present invention relates to an aqueous resin composition, a recording material, an ink jet recording material and an ink jet recording method useful for applications to paints, inks, coatings and adhesives, wherein by incorporating a water soluble magnesium salt, the long term stability and the film formation improves.

2. Description of the Background Art

Aqueous polyurethanes with a hydrophilic group within the molecule generally do not require the use of an emulsifier, and consequently films formed therefrom display excellent water resistance, making them ideal for applications such as the various types of paint, inks, coatings, adhesives and recording materials.

However, aqueous polyurethanes produced using a strongly hydrophobic polyester polyol or polycarbonate polyol as a raw material display a rapid evaporation rate for the solvent medium, particularly water, and as a result have suffered from stability problems such as skin formation during storage. Furthermore, when applied to a substrate of any of the potential applications, because the evaporation rate of water from the film is rapid, problems can arise during the film formation such as a non-uniform film thickness or even the appearance of cracks.

A method for improving these problem areas by adding a high boiling point solvent to the aqueous polyurethane is known, but the resulting odors and related environmental concerns mean that this method is not entirely satisfactory, and in certain applications the method is completely unusable.

In addition, conventional applications of aqueous polyurethanes to water based paints, adhesives, inks, and recording materials are known to suffer from a variety of problems.

For example, when used as a water based paint, the non-uniformity of the paint film reduces the functionality of the film including the weather resistance, the water resistance and the chemical resistance, and the exterior surface of the paint film is also susceptible to problems. In addition, the adhesion of the paint to a substrate and the recoatability also deteriorate significantly.

In the field of adhesives, the adhesive strength is largely dependent on the adhesive layer, and in particular on the uniformity of the adhesive film thickness, and so the problems described above are critical.

When used in an ink, because the ink is more susceptible to skinning, for example inside the ink filled vat of a Gravure printer, trouble is more likely to occur during continuous print runs. In addition, the ink can also cause printing failure such as plate jamming.

In the field of recording materials, recording materials comprising a polyurethane resin or another resin composition applied to a substrate such as a synthetic resin film or a piece of paper, for use with ink jet printers, thermal transfer printers, laser printers or offset printers are already known. As the aforementioned resin composition, an aqueous polyurethane displays excellent performance in any printing application regardless of the printing method employed, and Japanese Unexamined Patent Application, First Publication No. Hei 10-181189 discloses an aqueous polyurethane composition combined with a water soluble epoxy compound, an acetoacetylated polyvinyl alcohol, or an epichlorohydrin polyamide resin.

However, even a recording material using this composition does not display ideal film uniformity and ink absorption, and particularly in the case of printing with an ink jet printer using pigment inks, finely detailed printed images are unattainable.

Furthermore recently in the field of recording materials, printers which utilize inks containing dye are used for printing, but the quality is unsatisfactory for use as a recording material for illuminated advertising. In other words, in illuminated advertising the printed surface of the recording material is often laminated with a light fast film to enable use outdoors, which means the recording material must have good durability, good water resistance, and also be suitable for lamination, but recording materials which utilize inks containing dye are not entirely satisfactory in any of these respects.

Accordingly, pigment inks are now being used as the printer inks in the rapidly expanding field of illuminated applications. However, in terms of the resin composition used as the ink receiving layer of the recording material, no resin existed which was able to adequately satisfy the requirements of binder dispersibility, strength of the product recording material, and smoothness of the applied film surface.

SUMMARY OF THE INVENTION

An ink jet recording material of the present invention satisfies the characteristics required for an aforementioned outdoor illuminated ink jet recording material.

An object of the present invention is to provide an aqueous resin composition, which does not use a high boiling point solvent, and yet displays favorable long term stability and excellent film formation, and does not suffer from problems such as skin generation.

Another object of the present invention is to provide a recording material, which, by providing an ink receiving layer formed from the above composition on a substrate, offers excellent printing performance when applied to printing using ink jet printers, thermal transfer printers and laser printers, or to printing methods using offset printing or the like. In addition, yet another object of the present invention is to provide an ink jet recording material which improves printing performance, particularly for inks containing pigment, offers a practically applicable level of precision, ink absorption, abrasion resistance and color development, and also displays excellent workability in areas other than printing performance for application to illuminated advertising. In addition, yet another object of the present invention is to provide an ink jet recording method using the ink jet recording material described above.

As a result of intensive investigations aimed at resolving the problems described above, the inventors of the present invention discovered that an aqueous resin composition containing a water soluble magnesium salt in an aqueous polyurethane displayed excellent long term stability without suffering from problems such as skinning, and also offered excellent film formation. In addition, the inventors also discovered that when a recording layer formed from such a composition was provided on a variety of different substrates, and these substrates were then applied to printing using ink jet printers, thermal transfer printers and laser printers, or to printing methods using offset printing or the like, a superior printing performance which offered a considerable improvement in the conventional problematic areas described above could be achieved, and were consequently able to complete the present invention.

In other words, the present invention provides an aqueous resin composition comprising a water soluble magnesium salt (A) and an aqueous polyurethane (B).

Furthermore, the present invention also provides an aqueous resin composition for a recording material, comprising a water soluble magnesium salt (A) and an aqueous polyurethane (B).

In addition, the present invention also provides an aqueous resin composition for an ink jet recording material, comprising a water soluble magnesium salt (A), an aqueous polyurethane (B), and a porous pigment (D).

Furthermore, the present invention also provides a recording material with an ink receiving layer formed from an aqueous resin composition for a recording material, comprising a water soluble magnesium salt (A) and an aqueous polyurethane (B) formed on a substrate.

In addition, the present invention also provides an ink jet recording material formed by providing an ink receiving layer formed from an aqueous resin composition comprising a water soluble magnesium salt (A), an aqueous polyurethane (B) and a porous pigment (D) on a substrate.

In addition, the present invention also provides an ink jet recording method, wherein an ink jet recording material with an ink receiving layer is prepared by applying an aqueous resin composition for an ink jet recording material, comprising a water soluble magnesium salt (A) and an aqueous polyurethane (B) to a substrate, and an ink jet recording device is then used to perform ink jet recording on the ink jet recording material.

DETAILED DESCRIPTION OF THE PREFERRED EMBODIMENTS

As follows is a more detailed description of an aqueous resin composition of the present invention.

An aqueous resin composition of the present invention comprises a water soluble magnesium salt (A) and an aqueous polyurethane (B).

First is a description of the water soluble magnesium salt (A), which represents a primary constituent of the present invention.

The description of the water soluble magnesium salt (A) as being "water soluble" refers to a magnesium metal salt which displays a solubility of at least 1 g of the magnesium metal salt per 100 g of a saturated aqueous solution of the salt prepared in water at 20° C. Examples of the water soluble magnesium salt (A) include magnesium chloride, magnesium acetate, magnesium nitrate, magnesium phosphate, magnesium sulfate, and magnesium chlorate. Of these, in those cases where an aqueous resin composition of the present invention is used as the ink receiving layer of a recording material, then from the viewpoint of achieving good printability for pigment inks of ink jet printer (hereafter described as pigment printability), magnesium chloride is preferred. From the viewpoint of improving pigment printability, the quantity of the water soluble magnesium salt (A) used should preferably be within a range from 5 to 30 parts by weight per 100 parts by weight of the aqueous polyurethane resin solid contents. At quantities exceeding 30 parts by weight, the water soluble magnesium salt may precipitate out on the surface of the recording material causing surface stickiness, whereas at quantities less than 5 parts by weight, the pigment printability deteriorates.

Next is a description of the aqueous polyurethane (B), which also represents a primary constituent of an aqueous resin composition of the present invention.

The aqueous polyurethane (B) refers to a water dispersible or water soluble polyurethane with a hydrophilic group within the molecule. Of these polyurethanes, water dispersible polyurethanes are preferred from the viewpoint of the film water resistance. Furthermore, from the viewpoint of film durability, the aqueous polyurethane (B) should preferably comprise a polycarbonate chain and/or a polyester chain within the molecule.

The polyurethane may comprise either a polyester chain or a polycarbonate chain, although from the viewpoint of durability, polyurethanes with either an individual polycarbonate chain, or with a combination of a polycarbonate chain and a polyester chain are preferred.

By using an aqueous polyurethane (B) with either an individual polycarbonate chain, or with both a polycarbonate chain and a polyester chain, the color development on the printed surface of the recording material is superior to even that of an acrylic resin based emulsion, and moreover curling of the recording material is also suppressed.

Examples of commercially available aqueous polyurethanes (B) with a polycarbonate chain include polyurethane aqueous dispersions such as "Vondic" (brand name) and "Hydran" (brand name) manufactured by Dainippon Ink and Chemicals, Inc., and "Impranil" manufactured by Bayer AG Corporation. When these types of commercially available products are used, products containing as little emulsifier as possible should be selected in order to maintain the strength and water resistance of the film.

Examples of the hydrophilic group of the aqueous polyurethane (B) include cationic groups, anionic groups and nonionic groups.

Examples of suitable cationic groups include tertiary amino groups, and quaternary amino groups.

Examples of suitable anionic groups include sulfonic acid groups, sulfonate groups, carboxylic acid groups, carboxylate groups, hydroxyl groups and cyano groups.

Examples of suitable nonionic groups include ethylene oxide chains, propylene oxide chains, and ethylene oxide-propylene oxide chains.

When the aqueous polyurethane (B) is combined with a cationic compound described below, then from the viewpoint of improving the gloss and the printability of the film, the hydrophilic group should preferably be an anionic group, and sulfonate groups are particularly preferred in terms of improving the curl characteristics of a applied sheet produced by applying an aqueous resin composition of the present invention.

In cases in which the hydrophilic group is an anionic group, then in order to improve the gloss and the printability of the film as described above, the quantity of the anionic group within the aqueous dispersion of the aqueous polyurethane (B) should preferably be within a range from 0.5 to 10% by weight. If the quantity is less than 0.5% by weight then the stability of the aqueous polyurethane (B) dispersion deteriorates, whereas if the quantity exceeds 10% by weight then the stability of the polyurethane relative to the cationic compound described below is hindered, which is undesirable.

When an aqueous resin composition of the present invention is applied to a sheet, in order to prevent curling of the applied sheet, sulfonate groups are the most preferred anionic groups.

Sulfonate groups are typically introduced by using a diamine containing sulfonate group containing or a diol containing sulfonate group as a chain extender during a process for increasing the molecular weight (a chain extension process) of a urethane prepolymer with an isocyanate group at the terminal.

Furthermore, carboxylic acid groups can be combined with the sulfonate groups provided curling of the printed sheet does not develop.

There are no particular restrictions on the average particle diameter of the particles of the aqueous polyurethane (B), although from the viewpoints of ensuring good transparency when converted to a polyurethane aqueous dispersion and ensuring good water resistance of the product film, diameters of no more than 3.0 µm are preferred. If this average particle diameter exceeds 3.0 µm, then the storage stability, and the water resistance, transparency and print gloss of the product film deteriorate.

There are no particular restrictions on the molecular weight of the aqueous polyurethane (B), although in terms of maintaining film strength, number average molecular weights of at least 10,000 are preferred. Number average molecular weights of less than 10,000 result in a deterioration in the film strength and are consequently undesirable.

Next is a description of a method of producing an aqueous polyurethane (B) described above.

An aqueous polyurethane (B) can be produced using known production methods. Namely, examples of suitable known methods include (1) a method in which a polycarbonate polyol and/or a polyol with a polyester chain (hereafter described as a polyester polyol) (a) and a diisocyanate (b) are reacted together in a solvent, and the reaction mixture is then dispersed in an aqueous medium containing an emulsifier; and (2) a method in which a polycarbonate polyol and/or a polyester polyol (a) and a diisocyanate (b) are reacted together in a solvent to form a prepolymer with an isocyanate terminal, and this prepolymer is then reacted with a chain extender (c) and dispersed in water.

In order to generate an aqueous polyurethane (B) with a hydrophilic group according to the present invention, a polyol with a hydrophilic group as described below, and/or a compound containing hydrophilic groups such as carboxylic acid or sulfonate can be used as the raw materials.

Examples of suitable polyester polyols include polyesters produced by a dehydration condensation reaction of a polyol and a carboxylic acid, polyesters produced by a ring opening polymerization of a cyclic ester compound such as E-caprolactone, and copolymerization polyesters thereof.

Examples of suitable polyols include ethylene glycol, propylene glycol, 1,3-propanediol, 1,4-butanediol, 1,5-pentanediol, 1,6-hexanediol, neopentyl glycol, diethylene glycol, triethylene glycol, tetraethylene glycol, polyethylene glycol, dipropylene glycol, tripropylene glycol, bishydroxyethoxybenzene, 1,4-cyclohexanediol, 1,4-cyclohexanedimethanol, bisphenol A, hydrogenated bisphenol A, and hydroquinone. These polyols may be used singularly, or in combinations of two or more materials.

Examples of suitable carboxylic acids include succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy)ethane-p,p'-dicarboxylic acid, as well as anhydrides or ester forming derivatives of these dicarboxylic acids. These acids may be used singularly, or in combinations of two or more such acids.

Examples of suitable compounds containing hydrophilic group include compounds containing sulfonic acid group such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid and 2,4-diaminotoluene-5-sulfonic acid; compounds containing carboxylic acid group such as 2,2-dimethylolpropionic acid, 2,2-dimethylolbutyric acid, 2,2-dimethylolvalerianic acid, dioxymaleic acid and 2,6-dioxybenzoic acid; diethylenetriamine; compounds containing cationic group such as diols or dicarboxylic acids containing a cationic group such as an aforementioned tertiary amino group or a quaternary amino group as well as at least one active hydrogen; compounds containing nonionic group with an alkylene oxide repeating unit such as an ethylene oxide repeating unit or a propylene oxide repeating unit within the molecule as well as at least one active hydrogen; as well as any of various derivatives of these compounds.

These compounds may be used singularly, or in combinations of two or more such compounds.

In those cases in which a compound containing nonionic group is used as the compound containing hydrophilic group, then in order to improve the mechanical strength of the film it is preferable to use a compound with an alkylene oxide repeating unit and at least one active hydrogen within the molecule in combination with another compound without an alkylene oxide unit.

Examples of suitable polycarbonate polyols include materials produced by reacting a polyol with diphenyl carbonate or phosgene. As polycarbonate polyols with a hydrophilic group, the aforementioned hydrophilic group containing polyols may be utilized as a raw material.

The polyol may be one of the aforementioned polycarbonate polyols or polyester polyols, or another polyol can also be utilized.

Examples of suitable diisocyanates include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate. These diisocyanate compounds may be used singularly, or in combinations of two or more such compounds. Of these diisocyanates, from the viewpoints of improving the long term stability of an aqueous resin composition of the present invention and ensuring good light fastness of the product film, aliphatic diisocyanates are preferred.

Typically aqueous dispersions or aqueous solutions of aqueous polyurethanes produced using a strongly hydrophobic polyester polyol or polycarbonate polyol as the polyol display a rapid evaporation rate of the water medium, and as a result have suffered from stability problems such as skin formation during storage.

Furthermore, when such an aqueous polyurethane dispersion or the like is applied to a substrate, because the evaporation rate of water from the film is rapid, problems can arise during the film formation such as a non-uniform film thickness or even the appearance of cracks.

Because the water soluble magnesium salt (A) has the effect of controlling the drying rate of water (the solvent) from the aqueous polyurethane dispersion or the like, incorporation of a water soluble magnesium salt (A) is able to improve the long term stability and the film formation properties of an aqueous resin composition.

In addition, in those cases in which an aqueous resin composition of the present invention is used in a printing application, it is already known that, during storage, an aqueous polyurethane (B) or the like with a polycarbonate chain or a polyester chain causes a strengthening of the hydrogen bonding of urethane linkages within the aqueous polyurethane, and that this phenomenon has a deleterious effect on the printing performance. In an aqueous resin composition of the present invention, by combining a water soluble magnesium salt (A) with the aqueous polyurethane (B), the printing performance, and especially the pigment printability, can be improved. It is presumed that the water soluble magnesium salt (A) controls the degree of hydrogen bonding of the urethane linkages.

An aqueous resin composition of the present invention displays excellent long term stability and film formation, and forms a uniform film when applied to a variety of substrates, and consequently is ideal for applications such as the various types of water based paint, water based inks, water based coatings, water based adhesives and recording materials.

When an aqueous resin composition of the present invention is used as a water based paint, then the water based paint can be produced by normal paint production methods, by adding pigments, film formers, plasticizers, emulsifiers and dispersing agents and the like to the composition of the present invention. Such a water based paint displays excellent long term stability and film formation.

Furthermore, when an aqueous resin composition of the present invention is used as a water based adhesive, then the composition of the present invention may be used in an unmodified form, or a water based adhesive can also be produced by normal adhesive production methods, by adding extenders such as flour, starch or defatted soybean, and fillers such as clay, kaolin, talc or wood flour. These water based adhesives display excellent long term stability and adhesion.

Furthermore, in addition to the additives described above, one or more of a cationic compound, a nonionic water soluble high molecular compound, or a water soluble epoxy compound may also be added.

As follows is a description of an aqueous resin composition for a recording material according to the present invention.

An aqueous resin composition for a recording material of the present invention comprises a water soluble magnesium salt (A) and an aqueous polyurethane (B).

From the viewpoints of improving the dispersion stability, the film gloss, the printability for pigment inks, and the durability, the recording material aqueous resin composition should preferably also comprise at least one compound (C) selected from a group consisting of cationic compounds, nonionic water soluble high molecular compounds, and water soluble epoxy compounds.

Examples of suitable cationic compounds include tertiary amine compounds, polyamide resins, polyimide resins and epichlorohydrin polyamide resins. Of these, epichlorohydrin polyamide resins are preferred.

Generally, when an aqueous polyurethane (B) with an anionic group and a cationic compound are combined an aggregate forms, and in many cases it becomes difficult to maintain a stable dispersion within the water, although if an epichlorohydrin polyamide resin is used as the cationic compound then the stability of the aqueous resin composition dispersion improves, and problems such as the generation of aggregates become less likely.

By using a cationic compound in combination with an aqueous polyurethane (B) with an anionic group, both the printability and the gloss of the film of the ink receiving layer of the recording material can be improved.

The reasons for this observation are not entirely evident, and although micro aggregate structures arising from ionic interaction of the cationic compound (c-1) and the aqueous polyurethane (B) with an anionic group do form, it is assumed that these have certain relationship with the above effects.

Furthermore by using a cationic compound, the printability for pigment inks also improves.

Epichlorohydrin polyamide resins are typically known as paper strength additives. These resins can be produced by conventional methods, for example by the addition of epichlorohydrin to a polyamidepolyamine formed by the dehydration polycondensation of adipic acid and diethylenetriamine. Examples of commercially available resins of this type include WS525, WS535 and WS570 manufactured by Japan PMC Co., Ltd.

Examples of suitable nonionic water soluble high molecular compounds include polyvinyl alcohols, partially saponified polyvinyl alcohols, acetoacetylated polyvinyl alcohols, polyvinyl pyrolidones, methylcellulose, starch, polypeptides, and high molecular weight polyethylene oxides. Of these, from the viewpoint of improving the printability, partially saponified polyvinyl alcohols are preferred nonionic water soluble high molecular compounds, and acetoacetylated polyvinyl alcohols are even more preferred.

There are no particular restrictions on the degree of saponification of a partially saponified polyvinyl alcohol, although from the viewpoint of water solubility, values from 80 to 95 mol % are preferred.

Furthermore, an acetoacetylated polyvinyl alcohol is typically produced through an addition reaction of a liquid or gas state diketene to a polyvinyl alcohol resin in either powdered form or in a solution.

Examples of commercially available acetoacetylated polyvinyl alcohols include Gohsefimer-Z-100 and Gohsefimer-Z-200 (both brand names) manufactured by The Nippon Synthetic Chemical Industry Co., Ltd.

In those cases in which the aqueous resin composition of the present invention is an aqueous dispersion of a water soluble magnesium salt and an aqueous polyurethane, a nonionic water soluble high molecular compound is able to further stabilize the dispersed state of the water soluble magnesium salt and the aqueous polyurethane within the aqueous medium.

In order to maximize this dispersion stabilization, the number average molecular weight of the nonionic water soluble high molecular compound should preferably be within a range from 5,000 to 500,000.

There are no particular restrictions on the quantity of the nonionic water soluble high molecular compound, although quantities within a range from 50 to 500 parts by weight per 100 parts by weight of the resin solid contents of the aqueous polyurethane are preferred.

In order to improve the durability, such as the abrasion resistance of the substrate, an aqueous resin composition for a recording material of the present invention should preferably incorporate a water soluble epoxy compound. By combining such a water soluble epoxy compound with an aforementioned acetoacetylated polyvinyl alcohol, the durability can be improved even further.

Examples of suitable water soluble epoxy compounds include sorbitol polyglycidyl ether, sorbitan polyglycidyl ether, polyglcerol polyglycidyl ether, pentaerythritol polyglycidyl ether, diglycerol polyglycidyl ether, triglycidyl tris (2-hydroxyethyl)isocyanurate, glycerol polyglycidyl ether, trimethylolpropane polyglycidyl ether, neopentyl glycol diglycidyl ether, 1,6-hexanediol diglycidyl ether, and ethylene/propylene glycol diglycidyl ether. Of these, from the viewpoint of maximizing abrasion resistance of substrate when applied to a substrate, sorbitol based polyglycidyl ethers are preferred, and materials with at least three functional groups are even more preferred.

There are no particular restrictions on the quantity of the water soluble epoxy compound, and almost any quantity may be added, although quantities within a range from 0.1 to 20 parts by weight per 100 parts by weight of the resin solid contents of the aqueous polyurethane (B) are preferred.

An aqueous resin composition for a recording material of the present invention can be ideally used as a recording material for printing with ink jet printers, thermal transfer printers and laser printers, or printing using offset printing or the like.

Next is a brief description of the application of the present invention to printing using thermal transfer printers and laser printers, and to offset printing and the like.

Offset printing is a printing system which typically uses a so-called coated paper comprising a high quality paper which has been coated with latex, clay or starch or the like and undergone surface calender treatment, and the ink is transferred to the print surface via a rubber blanket. In order to improve the printability in offset printing, the surface smoothness of the coated paper must be good, and the coating layer must be made as bulky as possible.

An aqueous resin composition for a recording material of the present invention enables the bulkiness of the ink receiving layer to be increased, and also displays excellent surface smoothness of the produced ink receiving layer, and is consequently extremely effective for use within offset printing applications.

Furthermore by incorporating a cationic compound, an aqueous resin composition for a recording material of the present invention is able to offer even better offset printing performance. In such a case, by also using an aqueous polyurethane (B) with ester linkage units such as a polycarbonate chain, or a polycarbonate chain and a polyester chain, the dispersion stability can be improved. Furthermore because the ink receiving layer of the recording material is formed from a printable microporous structure, the bulkiness of the layer can be improved. By also incorporating a cross linking agent such as melamine or an epoxy compound, the ink receiving layer can be imparted with the favorable characteristics of offset printing, and in particular ink receptability in offset printing.

In recording materials used for printing with laser printers or thermal transfer printers, the level of smoothness of the recording material has a large effect on printing performance. Typically smoothness can be improved by providing an ink receiving layer on a substrate and then conducting a calendering treatment to impart good smoothness to the surface, but an ink receiving layer obtained by applying an aqueous resin composition for a recording material of the present invention has an inherent very high degree of smoothness, and the aqueous polyurethane of the aqueous resin composition also displays excellent adhesion to a variety of inks and toners, making an aqueous resin composition for a recording material of the present invention extremely effective for applications requiring printing by laser printer or the like.

Other additives may be incorporated within an aqueous resin composition for a recording material of the present invention, provided they do not impair the printability. Examples of specific additives include talc, kaolin, silica, calcium carbonate and aluminum oxide, the various antioxidants, and ultraviolet absorbers and the like. These additives can be used by mixing and dispersing within the aqueous resin composition.

Next is a description of an aqueous resin composition for an ink jet recording material of the present invention.

An aqueous resin composition for an ink jet recording material of the present invention comprises an aqueous resin composition for a recording material as described above, and an additional porous pigment (D). By incorporating this porous pigment (D), the brightness and printability of the ink receiving layer of the ink jet recording material can be improved without suffering any deterioration in the pigment ink absorption rate.

In those cases when an aqueous resin composition of the present invention exists as a water dispersed emulsion, micro aggregate structures form between the aqueous polyurethane (B) and the cationic compound, and if a porous pigment (D) is also present within the composition, then the composition is ideally suited as the ink receiving layer of an outdoor illuminated recording material.

Examples of the aforementioned porous pigment include wet silica, fumed silica, alumina, aluminum hydroxide, talc, kaolin, calcium carbonate, calcium sulfate, titanium dioxide, zinc oxide, zinc sulfide, zinc carbonate, diatomaceous earth, calcium silicate and zeolite.

Of these, from the viewpoints of pigment ink absorption and printability, wet silica is preferred. This wet silica is an amorphous silica produced using wet methods.

This amorphous silica should preferably have an average particle diameter of no more than 5 μm, and values from 2 to 5 μm are even more preferred. If the average particle diameter exceeds 5 μm then the pigment has a deleterious effect on the brightness and surface smoothness of the ink receiving layer, which is undesirable for outdoor applications. Wet silica with an average particle diameter of no more than 5 μm improves the brightness of the ink receiving layer and also prevents any deterioration in the pigment ink absorption capabilities.

In order to improve the printability, typically the weight ratio of amorphous silica to the other constituents within an aqueous resin composition (namely, silica/other constituents) should preferably be at least 1. However, in such cases the quantity of the polyurethane, which acts as the binder resin, is insufficient, and problems may arise in terms of a deterioration in the abrasion resistance and durability of the recording material.

In an aqueous resin composition for an ink jet recording material of the present invention, even if the ratio of silica/other constituents is less than 1, because ionic micro aggregate structures are formed between the cationic groups of the cationic compound and the anionic groups within the aqueous polyurethane (B), an ink receiving layer with good printability and a good degree of brightness can be formed without any reduction in the ink absorption rate.

Even if the quantity of amorphous silica is not particularly high, an aqueous resin composition for an ink jet recording material of the present invention offers good viscosity and viscosity control, and the produced ink jet recording material offers improved abrasion resistance and good suitability to lamination, enabling the material to be used for illuminated applications.

Examples of commercially available amorphous wet silica materials include Sylysia (brand name) manufactured by Fuji Silysia Chemical Ltd., Mizukasil (brand name) manufactured by Mizusawa Industrial Chemicals Ltd., and Nipsil (brand name) manufactured by Nippon Silica Industrial Co., Ltd.

An aqueous resin composition for an ink jet recording material of the present invention is ideally suited for use as a recording material for an ink jet printer, and is particularly suitable as an illuminated recording material for outdoor use.

An aqueous resin composition for an ink jet recording material of the present invention may incorporate the same types of additives described above in relation to the recording material aqueous resin compositions, provided such additives do not inhibit the various printability characteristics.

Recording materials and ink jet recording materials of the present invention (hereafter described simply as recording materials) comprise an ink receiving layer formed from an aqueous resin composition for a recording material or an aqueous resin composition for an ink jet recording material (hereafter described simply as an aqueous resin composition) on a substrate.

In other words, a recording material of the present invention can be prepared by applying an aqueous resin composition of the present invention to a substrate and then immediately drying the composition. In order to improve the pigment ink printability, the temperature during this drying process should preferably be no more than 100° C.

Examples of suitable substrates include paper, cardboard, synthetic resin films such as polyethylene, polypropylene, polyester or nylon, composite sheets of paper and a synthetic resin film, nonwoven fabric, and spunbond. For illuminated recording materials, materials which allow light transmission such as semi-transparent paper and cardboard or transparent synthetic resin films are preferred substrates.

Examples of methods for applying an aqueous resin composition of the present invention to a substrate include air knife application, blade application, roll coater application, application or immersion using a Gravure coater, comma coater application, size press coating, and gate roll coating.

As described above, a recording material of the present invention can be applied to printing using ink jet printers, thermal transfer printers and laser printers, or to printing methods using offset printing or the like.

As described above, an ink jet recording material of the present invention can be used for any printing application using an ink jet printer, but is particularly effective for the ink jet printing of outdoor illuminated advertising.

As follows is a description of an ink jet recording method of the present invention.

A substrate of the present invention may utilize any of the substrates described above.

A recording material of the present invention is prepared by coating an aqueous resin composition for an ink jet recording material described above onto a substrate, and then immediately drying the composition. The temperature during this drying process should preferably be no more than 100° C., as described above. If the temperature exceeds 100° C. then when the ink discharge volume of the ink jet printer is raised to maximum output, the ink may bleed on the ink receiving layer or cracks may appear.

Examples of suitable methods for applying an aqueous resin composition for an ink jet recording material to a substrate include any of the application methods described above.

Furthermore, in terms of obtaining the best brightness and pigment printability for the ink receiving layer, the thickness of the ink receiving layer on the substrate should preferably produce a dried coating of at least 20 $g/m^2$. If the dried coating is less than 20 $g/m^2$ then the brightness deteriorates, and when the ink discharge volume is raised to the maximum output level, there is a tendency for the ink to bleed, or for cracks to appear in the printed surface.

Ink jet recording devices can be broadly classified into continuous jet charge control type systems and on demand systems, and representative examples of such systems include charge modulated systems, diffusion systems, electromechanical conversion systems, electrothermal conversion systems and electrostatic attraction systems. The ink discharge principles for the ink jet recording device will depend on the system employed, although the present invention can be used with devices utilizing any of the above methods.

An ink jet recording method of the present invention can be applied to a variety of applications including documents for home use or commercial use, and is particularly suited to illuminated advertisements. An example of a recording method for such an illuminated advertisement uses a light transmissible substrate, to which an aqueous resin composition for an ink jet recording material is applied to form an ink jet recording material with an ink receiving layer. Ink jet recording is then performed onto this recording material using an ink jet printer, and the thus recorded image is attached to at least one surface of a display case with a hollow section, and light is projected from inside this hollow section on to the rear surface of the recorded image. By projecting the light from the rear surface of the recorded image, the image can be made to appear to float, enhancing the effect of the display.

In such a case, in order to improve the light fastness of the recorded image, the image may also be covered with a light fast laminate film.

This type of illuminated advertisement can be used for commercial advertising such as in department stores, as well as for many other uses such as timetables on train station platforms and large illuminated advertisements at airports and the like.

EXAMPLES

As follows, the present invention is described in further detail, using a series of examples. Unless otherwise stated, all references to "parts" refer to parts by weight.

Example 1

10 parts of magnesium chloride, 50 parts of Vondic 2250 (an aqueous dispersion of a polyurethane containing a polycarbonate chain, with an average particle diameter of 0.2 μm, manufactured by Dainippon Ink and Chemicals, Inc.), and 50 parts of WS535 (an epichlorohydrin polyamide resin manufactured by Japan PMC Co., Ltd) were mixed together, and yielded a stable aqueous resin composition which did not gel. After storage for one month this aqueous resin composition displayed no skinning and remained stable.

The equivalent of 50 parts of solid of Gohsefimer Z-200 (an acetoacetylated polyvinyl alcohol manufactured by The Nippon Synthetic Chemical Industry Co., Ltd.) was then added to the dispersion, yielding an aqueous resin composition of the present invention. During this stage, the dispersion remained stable and did not gel.

A sample of this aqueous resin composition with a 30% solid contents was applied to an uncoated polyethylene terephthalate film (hereafter abbreviated as a PET film) using a comma coater in a sufficient quantity to form a dried film thickness of 30 μm, and the film was then dried at 90° C. for 3 minutes to yield a recording material of the present invention (hereafter referred to as the recording material A).

Example 2

10 parts of magnesium chloride, the equivalent of 30 parts of solid of Hydran HW-970 (an aqueous dispersion of a polyurethane with a sulfonic acid group and a polycarbonate chain, manufactured by Dainippon Ink and Chemicals, Inc.), the equivalent of 70 parts of solid of Gohsefimer Z-200 (an acetoacetylated polyvinyl alcohol manufactured by The Nippon Synthetic Chemical Industry Co., Ltd.), and 30 parts of WS535 (an epichlorohydrin polyamide resin manufactured by Japan PMC Co., Ltd) were mixed together, and yielded an aqueous resin composition of the present invention. After storage for one month in a similar manner to the example 1, this composition also displayed no skinning and remained stable.

A sample of this aqueous resin composition was applied to an uncoated PET film under similar conditions to the example 1, and was subsequently dried under the same conditions as the example 1, and yielded a recording material of the present invention (hereafter referred to as the recording material B).

Example 3

To the equivalent of 100 parts of solid of the aqueous resin composition produced in the example 1 was added a 5% of solid of CR-5L (a water soluble epoxy compound manufactured by Dainippon Ink and Chemicals, Inc.), yielding an aqueous resin composition of the present invention. After storage for one month, this composition also displayed no skinning and remained stable.

A sample of this aqueous resin composition was applied to an uncoated PET film under similar conditions to the example 1, and was subsequently dried under the same conditions as the example 1, and yielded a recording material of the present invention (hereafter referred to as the recording material C).

Example 4

With the exception of replacing the Vondic 2250 from the example 1 with a 50:50 solid fraction mixture of Hydran HW-930 (an aqueous dispersion of a polyurethane with a sulfonic acid group and a polyester polyol chain, with an average polyurethane particle diameter of 0.2 μm, manufactured by Dainippon Ink and Chemicals, Inc.) and Hydran HW-970 (an aqueous dispersion of a polyurethane containing a polycarbonate polyol chain, with an average polyurethane particle diameter of 0.1 μm, manufactured by Dainippon Ink and Chemicals, Inc.), an aqueous resin composition was prepared with the same composition as the example 1. After storage for one month, the composition displayed no skinning and remained stable. A sample of this aqueous resin composition was applied to an uncoated PET film under similar conditions to the example 1, and was subsequently dried under the same conditions as the example 1, and yielded a recording material of the present invention (hereafter referred to as the recording material D).

Example 5

With the exception of removing the WS535, an aqueous resin composition was prepared with the same composition as the example 2, and after storage for one month in a similar manner to the example 1, the composition displayed no skinning and remained stable. A sample of this aqueous resin composition was applied to an uncoated PET film and dried to yield a recording material of the present invention (hereafter referred to as the recording material E).

Example 6

With the exception of replacing the magnesium chloride from the example 2 with magnesium nitrate, an aqueous resin composition was prepared with the same composition as the example 2. After storage for one month, the composition displayed no skinning and remained stable. A sample of this aqueous resin composition was applied to an uncoated PET film and dried to yield a recording material of the present invention (hereafter referred to as the recording material F).

Example 7

With the exception of replacing the magnesium chloride from the example 2 with magnesium acetate, an aqueous resin composition was prepared with the same composition as the example 2. After storage for one month, the composition displayed no skinning and remained stable. A recording material of the present invention was also prepared in the same manner as the example 2 (hereafter referred to as the recording material G).

Example 8

150 parts of wet silica Sylysia 436 with an average particle diameter of 2.5 μm (a wet silica manufactured by Fuji Silysia Chemical Ltd.), 10 parts of magnesium chloride, 50 parts of Vondic 2250 (an aqueous dispersion of a polyurethane containing a polycarbonate chain, with an average particle diameter of 0.2 μm, manufactured by Dainippon Ink and Chemicals, Inc.), and 50 parts of WS535 (an epichlorohydrin polyamide resin manufactured by Japan PMC Co., Ltd) were mixed together, and yielded a stable aqueous resin composition which did not gel. The equivalent of 50 parts of solid of Gohsefimer Z-200 (an acetoacetylated polyvinyl alcohol manufactured by The Nippon Synthetic Chemical Industry Co., Ltd.) were then added to the dispersion, yielding an aqueous resin composition of the present invention. After storage for one month, the composition displayed no skinning and remained stable.

A sample of this aqueous resin composition with a 30% solid contents was applied to an uncoated, transparent PET film of thickness 100 μm using a comma coater in a sufficient quantity to form a dried film thickness of 30 μm, and the film was then dried at 120° C. for 3 minutes to yield an ink jet recording material of the present invention (hereafter referred to as the recording material H).

Example 9

120 parts of Mizukasil P-78A (a wet silica with an average particle diameter of no more than 3 μm, manufactured by Mizusawa Industrial Chemicals, Ltd), 10 parts of magnesium chloride, and 30 parts of solid of Hydran HW-970 (an aqueous dispersion of a polyurethane with a sulfonic acid group and a polycarbonate chain, manufactured by Dainippon Ink and Chemicals, Inc.) were combined, and an additional 70 parts of solid of Gohsefimer Z-200 (an acetoacetylated polyvinyl alcohol manufactured by The Nippon Synthetic Chemical Industry Co., Ltd.), and 30 parts of WS535 (an epichlorohydrin polyamide resin manufactured by Japan PMC Co., Ltd) were then added, yielding an aqueous resin composition. After storage for one month, this composition displayed no skinning and remained stable.

A sample of this aqueous resin composition was applied to an uncoated, transparent PET film under similar conditions to the example 8, and was subsequently dried to yield an ink jet recording material of the present invention (hereafter referred to as the recording material I).

Example 10

To 100 parts of solid of the stable aqueous resin composition produced in the example 1 was added 5 parts of solid of CR-5L (a water soluble epoxy compound manufactured by Dainippon Ink and Chemicals, Inc.), yielding an aqueous resin composition.

A sample of this aqueous resin composition was applied to a transparent PET film under similar conditions to the example 1, and was subsequently dried to yield a recording material of the present invention (hereafter referred to as the recording material J).

Example 11

With the exception of replacing the magnesium chloride from the example 8 with magnesium nitrate, an aqueous resin composition was prepared with the same composition as the example 8. Using the same procedure as the example 8, a recording material of the present invention was then prepared (hereafter referred to as the recording material K).

Using the 4 color water based inks described below, ink jet recording was performed on each of the recording materials A, B, C, D, E, F and G using a NovaJet Pro ink jet recording device (an ink jet wide format printer, manufactured by Encad Inc.), yielding a recorded image.

The recording device used NovaJet ink jet GO inks (brand name), and was controlled so that the cyan ink (C), the magenta ink (M), the yellow ink (Y), the black ink (K), the mixture of cyan ink and magenta ink (CM), the mixture of cyan ink and yellow ink (CY), the mixture of magenta ink and yellow ink (MY), the mixture of cyan ink, magenta ink and yellow ink (CMY), and the mixture of cyan ink, magenta ink, yellow ink and black ink (CMYK) were output at maximum discharge volume.

Using UV inks (brand name, manufactured by Hewlett-Packard Company), ink jet recording was performed on each of the recording materials H, I, J and K using a DesignJet 3800CP recording device (an ink jet wide format printer, manufactured by Hewlett-Packard Company), yielding a recorded image.

The results of evaluations of the recording characteristics of the recording materials produced in the above examples, and the image characteristics of the recorded images produced, are shown in Table 1.

TABLE 1

| Example | Recording material | Pigment printability | Color Development | Abrasion resistance | Surface smoothness |
|---|---|---|---|---|---|
| 1 | A | ◯ | 7.84 | ◯ | ◯ |
| 2 | B | ◯ | 8.05 | ◯ | ◯ |
| 3 | C | ◯ | 7.99 | ◯ | ◯ |
| 4 | D | ◯ | 7.90 | Δ | ◯ |
| 5 | E | ◯ | 7.04 | ◯ | ◯ |
| 6 | F | ◯ | 7.50 | ◯ | ◯ |
| 7 | G | ◯ | 7.41 | ◯ | ◯ |
| 8 | H | ◯ | 8.00 | ◯ | ◯ |
| 9 | I | ◯ | 8.35 | ◯ | ◯ |
| 10 | J | ◯ | 8.13 | ◯ | ◯ |
| 11 | K | ◯ | 7.69 | ◯ | ◯ |

<Evaluation of Ink Jet Pigment Ink Printability>

Each of the recording materials produced in the above examples was subjected to solid printing with an ink jet recording device, and the appearance of the printed surface, and the presence or absence of bleeding were evaluated, and one minute after completion of printing, a sheet of plain paper (hereafter referred to as a PPC) was placed on the printed surface, and the quantity of ink transferred to the PPC was assessed.

Samples for which the printing was good, and for which there was no bleeding or ink transfer to the PPC were evaluated as O, samples for which the printing was good, and for which there was no ink transfer to the PPC but for which there was slight bleeding were evaluated as OΔ, and samples for which the printing was unsatisfactory, or for which there was significant bleeding or ink transfer to the PPC were evaluated as X.

<Method of Measuring Color Development and Evaluation thereof>

Each of the recording materials produced in the above examples was subjected to solid printing with an ink jet recording device, and a Gretag reflection densitometer (manufactured by Gretag Ltd.) was then used to measure the density of color development within solid printed sections. The combined total of the measured values was used for evaluation. Higher numerical values of this combined total mean higher levels of color development.

<Method of Measuring Abrasion Resistance and Evaluation thereof>

Each of the recording materials produced in the above examples was subjected to solid printing with an ink jet recording device, and the printed surface was then scraped with a cotton swab and a determination was made as to whether or not any color had been rubbed off. The evaluations were reported at one of three levels, with the symbol O used for samples in which no color was rubbed off, the symbol Δ used for samples in which some coloring was rubbed off, and the symbol X used for samples in which considerable coloring was rubbed off.

<Method of Measuring Gloss and Transparency, and Evaluations thereof>

The transparency of the recording materials produced in the above examples, and the gloss of the recording material surfaces were evaluated by visual inspection.

The evaluations were reported at one of three levels, with the symbol O used for transparent samples with no turbidity and good gloss, the symbol Δ used for samples with some turbidity, and the symbol X used for non-transparent samples with considerable turbidity.

<Method of Measuring Surface Smoothness and Evaluation Thereof>

The surface of each of the recording materials produced in the above examples was analyzed by touch to determine the smoothness of the surface. Samples for which the ink receiving layer displayed no lumps or irregularities were evaluated as O, samples with some roughness were evaluated as Δ, and samples with large number of fine lumps or irregularities were evaluated as X.

Comparative Example 1

An aqueous resin composition was prepared in a similar manner to the example 2, with the exception of replacing the magnesium chloride with barium chloride, and replacing the Hydran HW-970 with Hydran HW-301 (an aqueous dispersion of a polyester polyurethane containing a carboxylic acid group, manufactured by Dainippon Ink and Chemicals, Inc.). The aqueous resin composition was dried at 90° C. for 30 seconds to yield a recording material (hereafter referred to as the recording material L).

Comparative Example 2

With the exception of using calcium chloride, a recording material (hereafter referred to as the recording material M) was prepared in the same manner as the comparative example 1.

TABLE 2

| Comparative Example | Recording material | Pigment printability | Color Develpment | Abrasion resistance | Surface smoothness |
|---|---|---|---|---|---|
| 1 | L | X | 5.40 | X | Δ |
| 2 | M | X | 4.09 | Δ | Δ |

An aqueous resin composition of the present invention displays superior long term stability and excellent film formation and does not suffer from problems such as skin generation, even without using a high boiling point solvent.

Furthermore, an aqueous resin composition for a recording material and an aqueous resin composition for an ink jet recording material of the present invention display excellent long term stability and film formation, and consequently the ink receiving layer of a recording material produced by applying such a composition to a substrate displays excellent surface smoothness, abrasion resistance and color development. Because an aqueous resin composition for an ink jet recording material of the present invention also incorporates a porous pigment, the ink receiving layer of an ink jet recording material of the present invention displays superior printability and durability for pigment inks.

In addition, an ink jet recording method of the present invention enables the production of a recording material with superior pigment ink printability and film durability, and is consequently particularly suited to applications such as outdoor illuminated advertising.

What is claimed is:

1. A recording material with an ink receiving layer, formed from an aqueous resin composition for a recording material, comprising a water soluble magnesium salt (A) and an aqueous polyurethane (B) containing a polycarbonate chain, or a polycarbonate chain and a polyester chain, having a number average molecular weight of at least 10,000 and an average particle diameter of no more than 3.0 μm, and having sulfonate groups as anionic groups within the molecule, formed on a substrate.

2. A recording material according to claim 1, wherein said recording material aqueous resin composition further comprises at least one compound (C) selected from a group consisting of cationic compounds, nonionic water soluble high molecular compounds having an average number molecular weight of 5,000 to 500,000, and water soluble epoxy compounds.

3. An ink jet recording material with an ink receiving layer, formed from an aqueous resin composition for an ink jet recording material, comprising a water soluble magnesium salt (A), an aqueous polyurethane (B) containing a polycarbonate chain, or a polycarbonate chain and a polyester chain, having a number average molecular weight of at least 10,000 and an average particle diameter of no more than 3.0 μm, and having sulfonate groups as anionic groups within the molecule, and a porous pigment (D), formed on a substrate.

4. An ink jet recording material according to claim 3, wherein said ink jet recording material aqueous resin composition further comprises at least one compound (C) selected from a group consisting of cationic compounds, nonionic water soluble high molecular compounds having an average number molecular weight of 5,000 to 500,000, and water soluble epoxy compounds.

5. An ink jet recording material according to claim 3, wherein said porous pigment (D) is a porous pigment with an average particle diameter of no more than 5 μm.

6. An ink jet recording method for ink jet recording on an ink jet recording material using an ink jet recording device, wherein an ink jet recording material with an ink receiving layer which is a dry coating of at least 20 g/m$^2$ is prepared by applying an aqueous resin composition for an ink jet recording material, comprising a water soluble magnesium salt (A) and an aqueous polyurethane (B) containing a polycarbonate chain, or a polycarbonate chain and a polyester chain, having a number average molecular weight of at least 10,000 and an average particle diameter of no more than 3.0 μm, and having sulfonate groups as anionic groups within the molecule, to a substrate, and ink jet recording is then performed on said ink jet recording material using an ink jet recording device.

* * * * *